(12) United States Patent
Desaki (10) Patent No.: US 11,654,861 B2
(45) Date of Patent: May 23, 2023

(54) SEAT BELT FASTENED/UNFASTENED STATE DETECTION SWITCH

(71) Applicant: HOSIDEN CORPORATION, Osaka (JP)

(72) Inventor: Kenjiro Desaki, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 155 days.

(21) Appl. No.: 17/186,395

(22) Filed: Feb. 26, 2021

(65) Prior Publication Data
US 2021/0323500 A1    Oct. 21, 2021

(30) Foreign Application Priority Data
Apr. 15, 2020    (JP) .............................. JP2020-072848

(51) Int. Cl.
*B60R 22/48*    (2006.01)
*B60R 22/18*    (2006.01)

(52) U.S. Cl.
CPC .............. *B60R 22/48* (2013.01); *B60R 22/18* (2013.01); *B60R 2022/1806* (2013.01); *B60R 2022/4883* (2013.01)

(58) Field of Classification Search
CPC . B60R 22/18; B60R 22/48; B60R 2022/1806; B60R 2022/1812;
(Continued)

(56) References Cited

U.S. PATENT DOCUMENTS 3,154,167 A * 10/1964 Butler .................... B60R 22/48
                                                         280/801.1
3,833,781 A *  9/1974 Rumpf .................... H01H 1/42
                                                         200/254
(Continued)

FOREIGN PATENT DOCUMENTS

JP    2009240528 A  * 10/2009
JP    2015095303 A  *  5/2015  ............. H01H 21/08
(Continued)

OTHER PUBLICATIONS

Search Report issued in European Patent Office (EPO) Patent Application No. 21168105.1, dated Oct. 15, 2021.

*Primary Examiner* — Barry Gooden, Jr.
(74) *Attorney, Agent, or Firm* — Greenblum & Bernstein, P.L.C.

(57) ABSTRACT

A seat belt fastened/unfastened state detection switch includes: a printed substrate that includes a circuit for detecting a fastened/unfastened state of a seat belt; a rotor that is rotatably attached to the printed substrate, includes a contact portion, the contact portion coming into contact with a tongue of the seat belt, and rotates in a forward direction in accordance with pushing of the tongue into a buckle; a spring that makes the rotor, the rotor being in a rotated state in the forward direction, rotate in a reverse direction in accordance with pulling of the tongue from the buckle; and an electric brush that is attached to a surface of the rotor, the surface facing the printed substrate, and includes a leg portion whose contact/non-contact state with respect to a conductive part of the circuit changes depending on a rotation state of the rotor.

6 Claims, 6 Drawing Sheets

(58) Field of Classification Search
CPC .... B60R 2022/4808; B60R 2022/4816; B60R 2022/4883; B60R 2022/4891
See application file for complete search history.

(56) References Cited

U.S. PATENT DOCUMENTS

| | | | | |
|---|---|---|---|---|
| RE28,804 E | * | 5/1976 | Sardo, Jr. | B60R 22/48 340/687 |
| 4,052,775 A | | 10/1977 | Gavagan et al. | |
| 4,377,888 A | * | 3/1983 | Ikesue | A44B 11/2511 D11/216 |
| 4,798,970 A | * | 1/1989 | Okamoto | H05B 6/6435 219/703 |
| 6,002,325 A | * | 12/1999 | Conaway | B60R 22/48 340/384.1 |
| 6,076,239 A | * | 6/2000 | Kopetzky | B60R 21/01546 24/641 |
| 6,381,815 B1 | * | 5/2002 | Yamaguchi | B60R 22/48 24/641 |
| 6,680,444 B1 | * | 1/2004 | Lee | G06F 3/0338 200/557 |
| 6,864,440 B2 | * | 3/2005 | Kim | H01H 19/63 200/11 R |
| 6,943,305 B2 | * | 9/2005 | Kawamura | H01H 25/04 200/6 A |
| 7,135,646 B2 | * | 11/2006 | Tan | H01H 25/065 200/406 |
| 7,262,373 B2 | * | 8/2007 | Miura | H01H 25/008 200/14 |
| 8,217,282 B2 | * | 7/2012 | Asada | H01H 19/003 200/406 |
| 8,921,723 B2 | | 12/2014 | Yamanaka et al. | |
| 8,952,279 B2 | | 2/2015 | Yamanaka et al. | |
| 8,952,283 B2 | | 2/2015 | Yamanaka et al. | |
| 9,266,499 B2 | | 2/2016 | Desaki et al. | |
| 9,616,847 B2 | | 4/2017 | Desaki et al. | |
| 2003/0033885 A1 | * | 2/2003 | Knox | G01L 1/2206 73/777 |
| 2004/0107550 A1 | * | 6/2004 | Lee | B60R 21/01546 24/303 |
| 2004/0111845 A1 | * | 6/2004 | Lee | B60R 22/48 24/303 |
| 2006/0219532 A1 | | 10/2006 | Tan | |
| 2007/0062787 A1 | * | 3/2007 | Miura | H01H 25/008 200/4 |
| 2008/0093205 A1 | * | 4/2008 | Borst | B60R 22/48 200/61.58 B |
| 2008/0129482 A1 | * | 6/2008 | Seguchi | B60R 22/48 340/457.1 |
| 2008/0173522 A1 | * | 7/2008 | Asada | H01H 19/003 200/4 |
| 2008/0308401 A1 | * | 12/2008 | Asada | H01H 25/008 200/6 R |
| 2009/0014308 A1 | * | 1/2009 | Asada | H01H 13/20 200/534 |
| 2009/0229963 A1 | * | 9/2009 | Yamanaka | H01H 25/008 200/525 |
| 2011/0067209 A1 | * | 3/2011 | Yamanaka | B60R 22/48 24/606 |
| 2012/0137478 A1 | * | 6/2012 | Nimura | B60R 22/48 24/593.1 |
| 2013/0175152 A1 | * | 7/2013 | Yamanaka | H01H 15/14 200/547 |
| 2014/0190812 A1 | * | 7/2014 | Yamanaka | H01H 19/11 200/529 |
| 2014/0367234 A1 | * | 12/2014 | Ebert | B60R 22/48 200/61.58 B |
| 2016/0288732 A1 | * | 10/2016 | Schmotzer | B60R 22/48 |
| 2022/0332282 A1 | * | 10/2022 | Desaki | H01H 19/18 |

FOREIGN PATENT DOCUMENTS

| | | |
|---|---|---|
| JP | 2016-159723 A | 9/2016 |
| JP | 6285378 B2 | 2/2018 |

* cited by examiner

FIG.6

SEAT BELT FASTENED/UNFASTENED STATE DETECTION SWITCH

TECHNICAL FIELD

The present invention relates to a seat belt fastened/unfastened state detection switch.

BACKGROUND ART

Japanese Patent Application Laid Open No. 2016-159723 (hereinafter, referred to as Patent Literature 1), for example, discloses a seat belt buckle switch as a related art.

The seat belt buckle switch of Patent Literature 1 includes a substrate installed in a buckle, electrode regions formed on the substrate, a slider fitted to the substrate to be slidable thereon and configured to slide interlockingly with the attaching/detaching operation of a tongue plate, a movable terminal having one or more conductive leg portions extending in the sliding direction of the slider to come into contact with the substrate or the electrode regions so that the slider can slide on the substrate to be or not to be in contact with the electrode regions, and a guide part configured by providing one or more step parts on the substrate, the step parts being continuously or intermittently extending along at least a part of the electrode regions, and the movable terminal being guided by the step parts during the sliding of the slider.

SUMMARY OF THE INVENTION

The operating direction of the seat belt buckle switch of Patent Literature 1 is the same as the operating direction of the tongue plate. This requires to use a switch whose operation range is the same as the movable range of the tongue plate, causing a problem on size increase of the switch.

Accordingly, the object of the present invention is to provide a small-sized seat belt fastened/unfastened state detection switch.

The seat belt fastened/unfastened state detection switch according to the present invention includes a printed substrate, a rotor, a spring, and an electric brush.

The printed substrate includes a circuit for detecting a fastened/unfastened state of a seat belt. The rotor is rotatably attached to the printed substrate, includes a contact portion, which comes into contact with a tongue of the seat belt, and rotates in a forward direction in accordance with pushing of the tongue into a buckle. The spring makes the rotor, which is in a rotated state in the forward direction, rotate in a reverse direction in accordance with pulling of the tongue from the buckle. The electric brush is attached to a surface of the rotor, which faces the printed substrate, and includes a leg portion whose contact/non-contact state with respect to a conductive part of the circuit changes depending on a rotation state of the rotor.

A seat belt fastened/unfastened state detection switch can be reduced in size.

DETAILED DESCRIPTION OF THE EMBODIMENTS

An embodiment of the present invention will be described in detail below. Components having the mutually same functions will be provided with the same reference numerals and duplicate description thereof will be omitted.

First Embodiment

Figure 1:
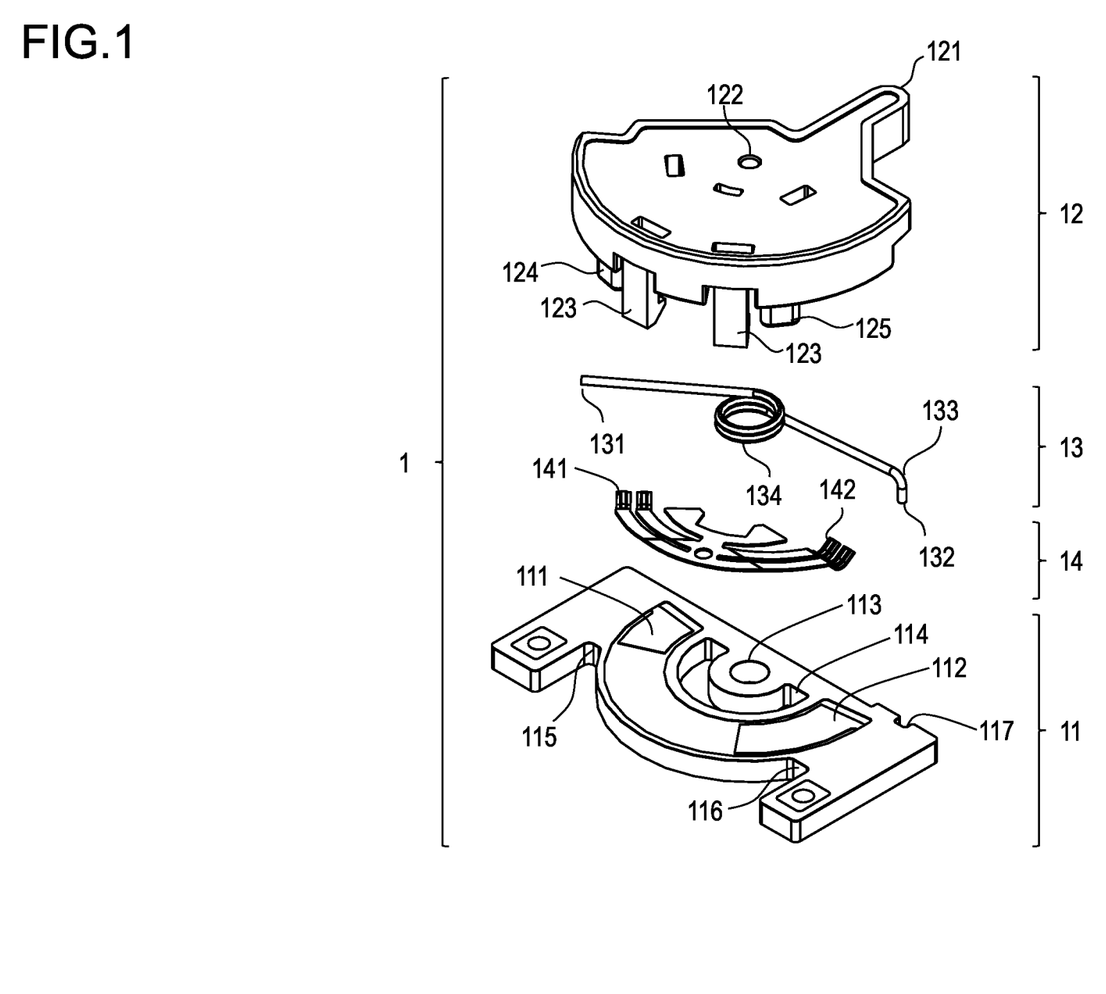
FIG. 1 is an exploded perspective view illustrating a seat belt fastened/unfastened state detection switch.

The configuration of a seat belt fastened/unfastened state detection switch according to a first embodiment will be described below with reference to FIG. 1. As illustrated in FIG. 1, this seat belt fastened/unfastened state detection switch 1 of the present embodiment includes a printed substrate 11, a rotor 12, a torsion coil spring 13, and an electric brush 14.

The printed substrate 11 includes a first circuit 111, a second circuit 112, a hole 113, a slit 114, a first groove 115, a second groove 116, and a recessed portion 117. The rotor 12 includes a contact portion 121, a shaft 122, claws 123, a first protrusion 124, and a second protrusion 125. The torsion coil spring 13 includes an end portion 131, an end portion 132, a bent portion 133, and a coil 134. The electric brush 14 includes a first leg portion 141 and a second leg portion 142.

Figure 2:
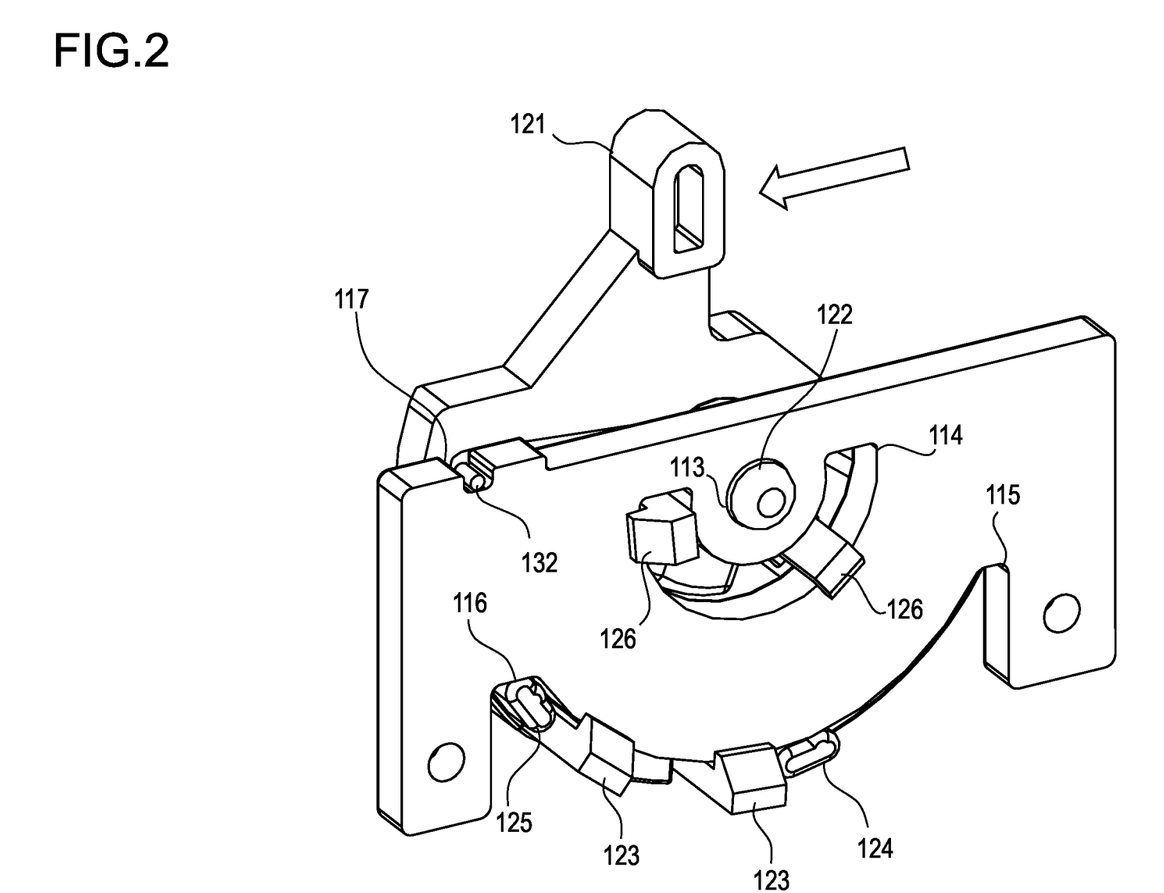
FIG. 2 is a first perspective view illustrating the seat belt fastened/unfastened state detection switch.

As illustrated in FIG. 2, the rotor 12 is rotatably attached to the printed substrate 11. Specifically, the rotor 12 includes the shaft 122 extending toward the printed substrate 11 and the printed substrate 11 includes the hole 113 to which the shaft 122 is fitted, enabling the rotor 12 to rotate about the shaft 122 serving as a rotating shaft.

The rotor 12 includes the contact portion 121, which comes into contact with a tongue of a seat belt, and rotates in a forward direction (the direction of an outlined arrow in FIG. 2) in accordance with pushing of the tongue into a buckle.

The rotor 12 further includes claws 126 that extend toward the printed substrate 11 and are projected to a direction different from the extending direction thereof, and the printed substrate 11 includes the slit 114 that has an arc shape and through which the claws 126 are inserted. The ends of the claws 126 are thus projected, so the ends of the claws 126 are engaged with the slit 114 and prevent the rotor 12 from lifting and falling.

In a similar manner, the rotor 12 includes the claws 123 that extend toward the printed substrate 11 and are projected to a direction different from the extending direction thereof. The ends of the claws 123 are engaged with a region of the printed substrate 11 which is cut into an arc shape and prevent the rotor 12 from lifting and falling.

Further, the rotor 12 includes the first protrusion 124 that limits the rotation in the forward direction and the second protrusion 125 that limits the rotation in the reverse direction. The printed substrate 11 includes the first groove 115 to which the first protrusion 124 is fitted when the rotor 12 is at a predetermined limited angle in the rotation in the forward direction and the second groove 116 to which the second protrusion 125 is fitted when the rotor 12 is at a predetermined limited angle in the rotation in the reverse direction. The printed substrate 11 is cut to have an arc shape between the first groove 115 and the second groove 116.

Figure 3:
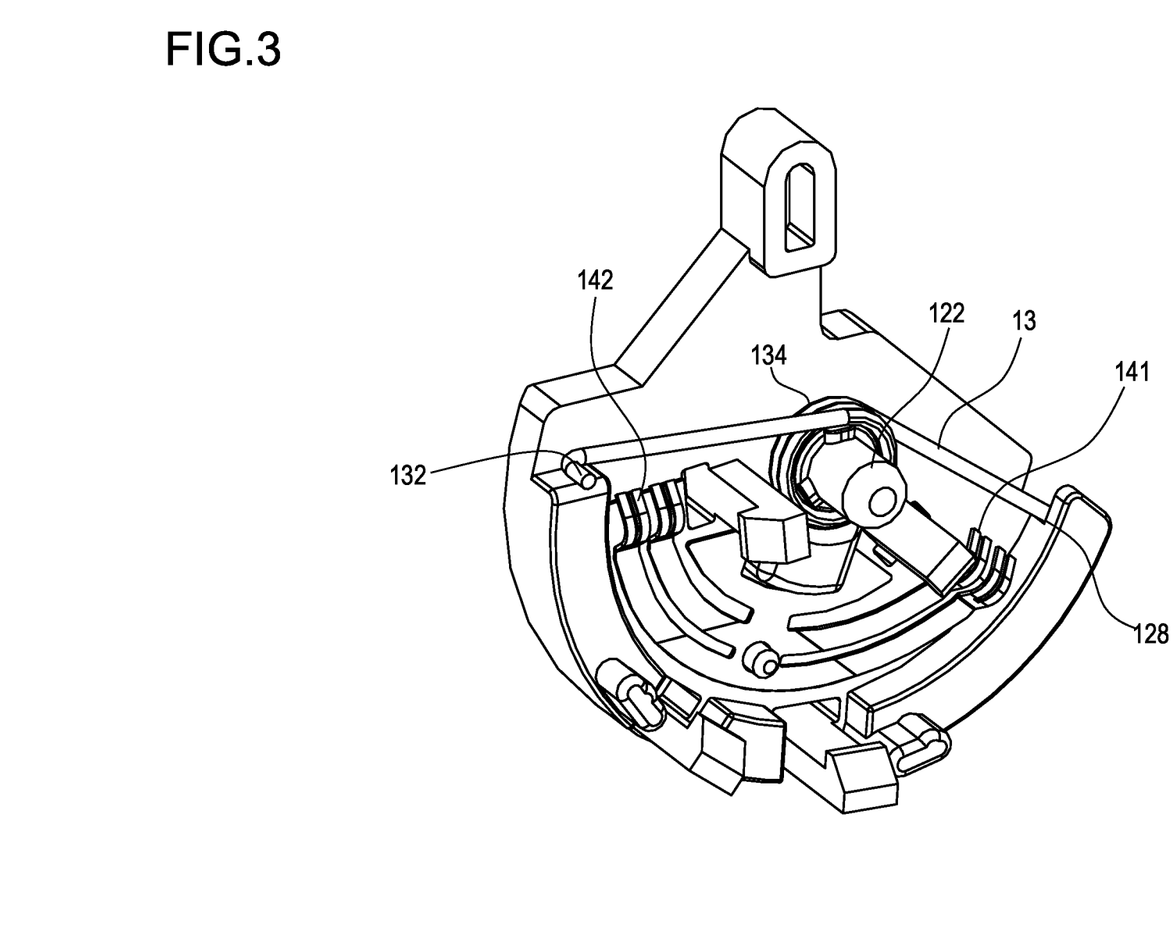
FIG. 3 is a first perspective view illustrating the seat belt fastened/unfastened state detection switch excluding a printed substrate.
Figure 4:
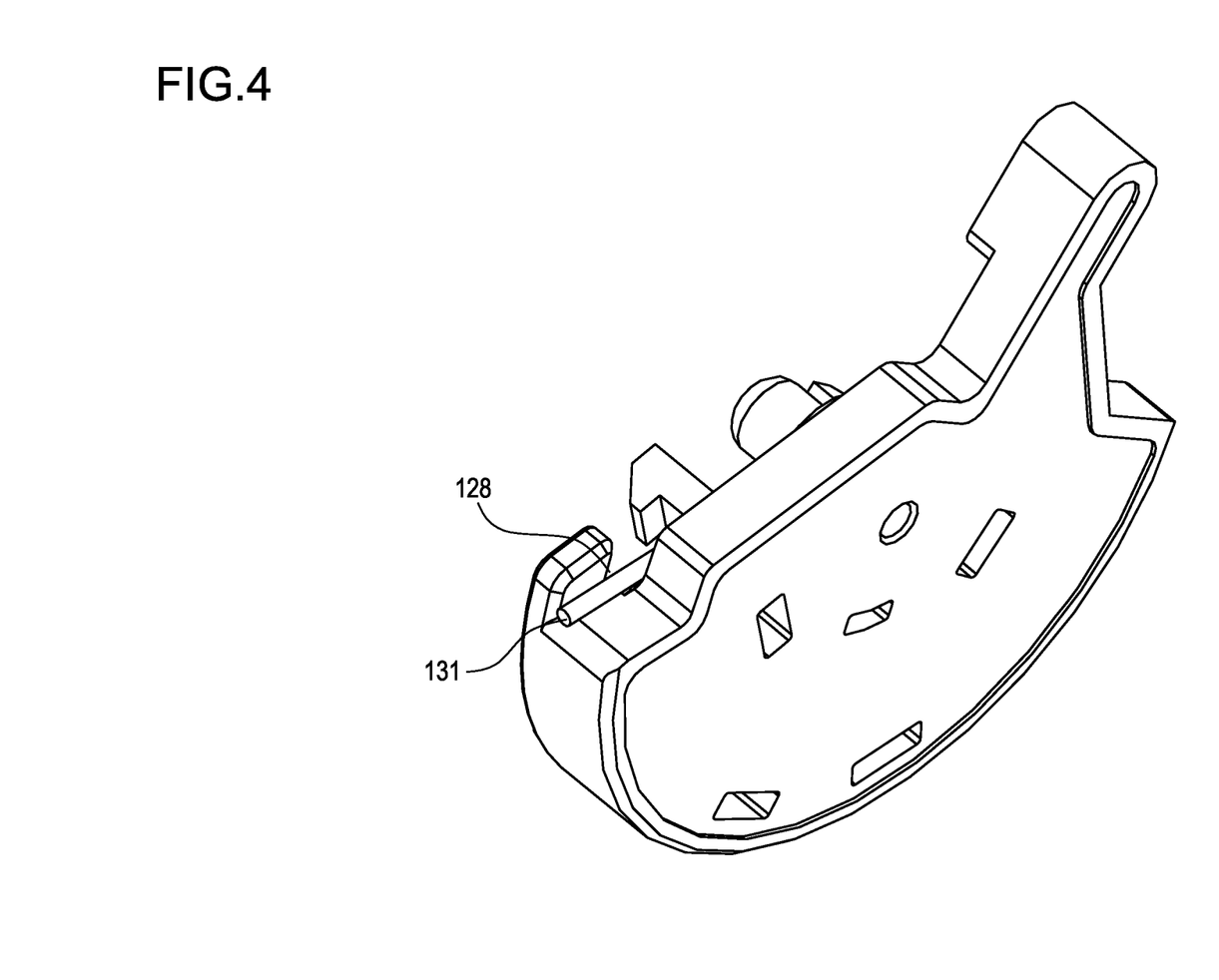
FIG. 4 is a second perspective view illustrating the seat belt fastened/unfastened state detection switch.

As illustrated in FIG. 3, the torsion coil spring 13 makes the rotor 12, which is in a rotated state in the forward direction, rotate in the reverse direction in accordance with pulling of the tongue from the buckle so as to return the rotor 12 to the initial state. The shaft 122 is inserted through the coil 134 of the torsion coil spring 13, and one end portion 131 of the torsion coil spring 13 is fixed in a groove 128 of the rotor 12 (also see FIG. 4) and the other end portion 132 of the torsion coil spring 13 is fixed in the recessed portion 117 of the printed substrate 11 (also see FIG. 2).

As illustrated in FIG. 3, the electric brush 14 is attached to a surface of the rotor 12 that faces the printed substrate 11. The electric brush 14 includes the first leg portion 141 whose contact/non-contact state with respect to a conductive part of the first circuit 111 on the printed substrate 11 changes depending on the rotation state of the rotor 12 and the second leg portion 142 whose contact/non-contact state with respect to a conductive part of the second circuit 112 on the printed substrate 11 changes depending on the rotation state of the rotor 12. Here, the first circuit 111 and the second circuit 112 are circuits used for detecting the fastened/unfastened state of the seat belt.

Figure 5:
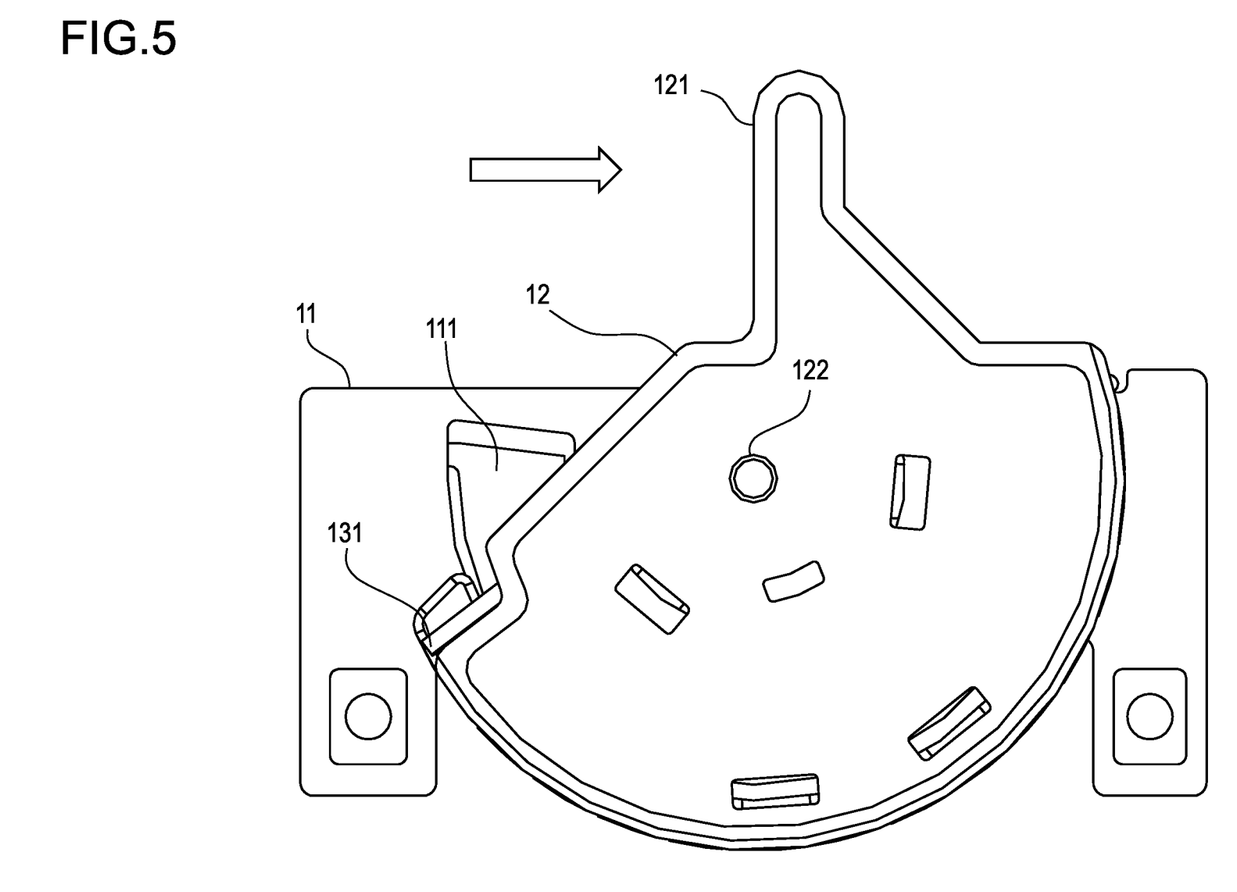
FIG. 5 is a plan view illustrating the seat belt fastened/unfastened state detection switch that is in an initial state.
Figure 6:
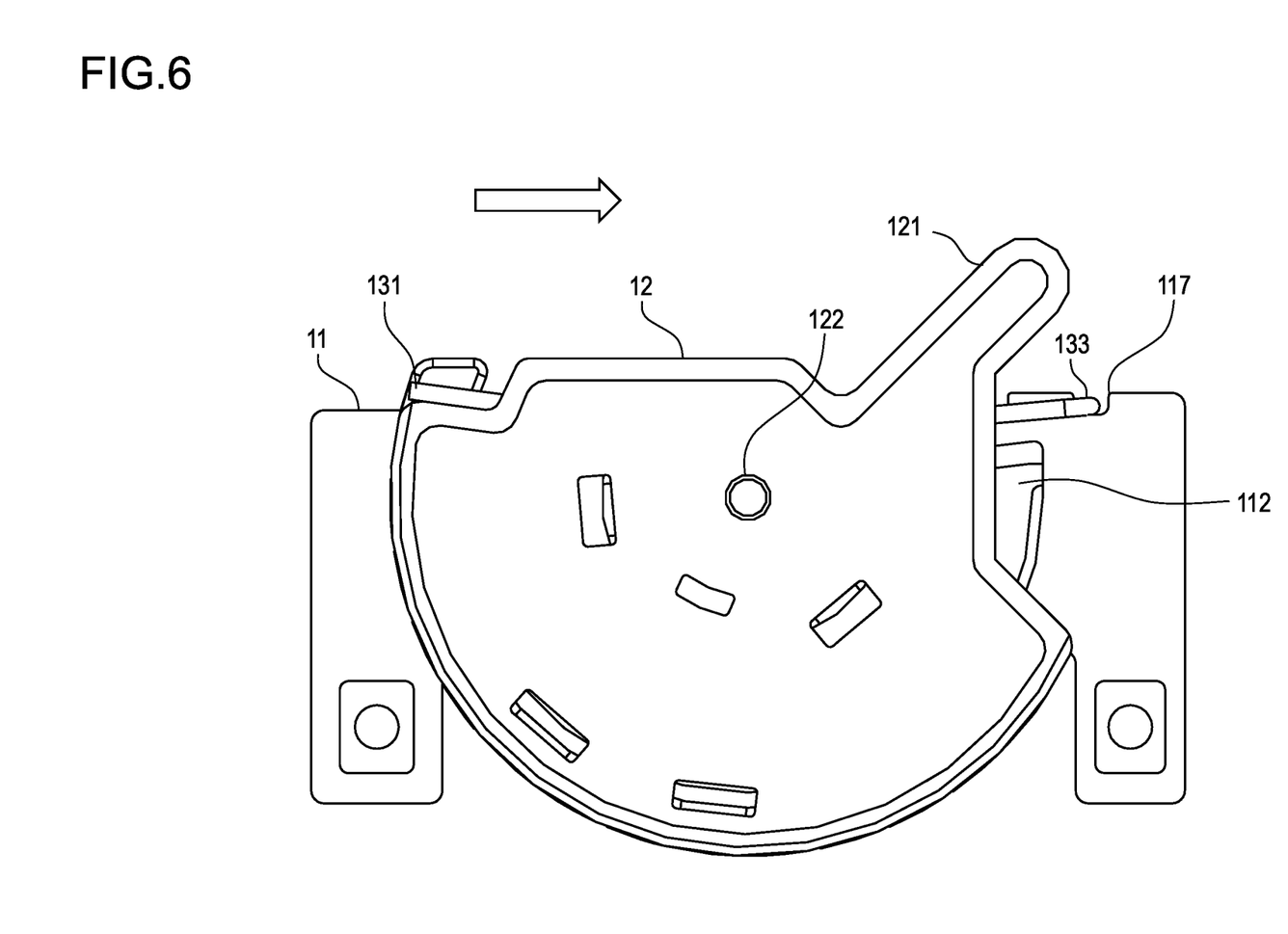
FIG. 6 is a plan view illustrating the seat belt fastened/unfastened state detection switch that is in a rotated state in a forward direction.

FIG. 5 illustrates the posture of the rotor 12 in the initial state and FIG. 6 illustrates the posture of the rotor 12 in the fully rotated state in the forward direction.

According to the seat belt fastened/unfastened state detection switch 1 of the present embodiment, the rotor 12 performing the rotating operation is used instead of a slider of the related art, which slides in one axis direction interlockingly with insertion/pull-out of a tongue of a seat belt into/from a buckle. Consequently, downsizing of the seat belt fastened/unfastened state detection switch is realized. Further, the torsion coil spring 13 enables the rotor 12, which is in a state that the rotor 12 has rotated in the forward direction in accordance with insertion of the tongue into the buckle, to rotate in the reverse direction in accordance with pulling of the tongue from the buckle, returning the rotor 12 to the initial state. Furthermore, the claws 123 and 126 formed on the rotor 12 can prevent the rotor 12 from lifting and falling from the printed substrate 11. In addition, the first protrusion 124 and the second protrusion 125 are formed on the rotor 12 and the first groove 115 and the second groove 116, to which the first protrusion 124 and the second protrusion 125 are respectively fitted, are formed, enabling the rotor 12 to perform the rotating operation within a range of a predetermined angle.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat belt fastened/unfastened state detection switch comprising:
    a printed substrate that includes a circuit for detecting a fastened/unfastened state of a seat belt;
    a rotor that is rotatably attached to the printed substrate, wherein the rotor includes:
        a contact portion, the contact portion coming into contact with a tongue of the seat belt, and rotates in a forward direction in accordance with pushing of the tongue into a buckle;
        a first protrusion that limits rotation in the forward direction; and
        a second protrusion that limits rotation in the reverse direction;
    a spring that makes the rotor, the rotor being in a rotated state in the forward direction, rotate in a reverse direction in accordance with pulling of the tongue from the buckle; and
    an electric brush that is attached to a surface of the rotor, the surface facing the printed substrate, and includes a leg portion whose contact/non-contact state with respect to a conductive part of the circuit changes depending on a rotation state of the rotor,
    wherein the printed substrate further includes:
        a first groove to which the first protrusion is fitted when the rotor is at a predetermined limited angle in the rotation in the forward direction; and
        a second groove to which the second protrusion is fitted when the rotor is at a predetermined limited angle in the rotation in the reverse direction.

2. The seat belt fastened/unfastened state detection switch according to claim 1, wherein
    the rotor includes a shaft that extends toward the printed substrate,
    the printed substrate includes a hole to which the shaft is fitted,
    the spring is a torsion coil spring, and
    the shaft is inserted through a coil of the torsion coil spring, one end portion of the torsion coil spring is fixed on the rotor, and the other end portion of the torsion coil spring is fixed on the printed substrate.

3. The seat belt fastened/unfastened state detection switch according to claim 2, wherein
    the rotor includes a claw that extends toward the printed substrate and is projected to a direction different from an extending direction thereof, and
    the printed substrate includes a slit that has an arc shape and through which the claw is inserted.

4. The seat belt fastened/unfastened state detection switch according to claim 1, wherein
    the rotor includes a claw that extends toward the printed substrate and is projected to a direction different from an extending direction thereof, and
    the printed substrate includes a slit that has an arc shape and through which the claw is inserted.

5. A seat belt fastened/unfastened state detection switch comprising:
    a rotor including:
        a contact portion, the contact portion coming into contact with a tongue of the seat belt, and rotates in a forward direction in accordance with pushing of the tongue into a buckle;
        a shaft that extends toward the printed substrate;
        a first protrusion that limits rotation in the forward directions; and
        a second protrusion that limits rotation in the reverse direction;
    a printed substrate to which the rotor is rotatably attached, the printed substrate including:

a circuit for detecting a fastened/unfastened state of a seat belt;
a hole to which the shaft is fitted;
a first groove to which the first protrusion is fitted when the rotor is at a predetermined limited angle in the rotation in the forward directions; and
a second groove to which the second protrusion is fitted when the rotor is at a predetermined limited angle in the rotation in the reverse directions;
a torsion coil spring that makes the rotor, the rotor being in a rotated state in the forward direction, rotate in a reverse direction in accordance with pulling of the tongue from the buckle, wherein the shaft is inserted through a coil of the torsion coil spring, one end portion of the torsion coil spring is fixed on the rotor, and the other end portion of the torsion coil spring is fixed on the printed substrate; and
an electric brush that is attached to a surface of the rotor, the surface facing the printed substrate, and includes a leg whose contact/non-contact state with respect to a conductive part of the circuit changes depending on a rotation state of the rotor.

6. A seat belt fastened/unfastened state detection switch comprising:
a printed substrate including:
a circuit for detecting a fastened/unfastened state of a seat belt; and
a slit that has an arc shape;
a rotor that is rotatably attached to the printed substrate, the rotor including:
a contact portion, the contact portion coming into contact with a tongue of the seat belt, and rotates in a forward direction in accordance with pushing of the tongue into a buckle;
a claw that extends toward and is inserted through the slit of the printed substrate and is projected to a direction different from an extending direction thereof;
a spring that makes the rotor, the rotor being in a rotated state in the forward direction, rotate in a reverse direction in accordance with pulling of the tongue from the buckle; and
an electric brush that is attached to a surface of the rotor, the surface facing the printed substrate, and includes a leg whose contact/non-contact state with respect to a conductive part of the circuit changes depending on a rotation state of the rotor, wherein:
the rotor further includes:
a first protrusion that limits rotation in the forward direction, and
a second protrusion that limits rotation in the reverse direction, and the printed substrate further includes:
a first groove to which the first protrusion is fitted when the rotor is at a predetermined limited angle in the rotation in the forward direction, and
a second groove to which the second protrusion is fitted when the rotor is at a predetermined limited angle in the rotation in the reverse direction.

\* \* \* \* \*

UNITED STATES PATENT AND TRADEMARK OFFICE
CERTIFICATE OF CORRECTION

PATENT NO. : 11,654,861 B2
APPLICATION NO. : 17/186395
DATED : May 23, 2023
INVENTOR(S) : Kenjiro Desaki It is certified that error appears in the above-identified patent and that said Letters Patent is hereby corrected as shown below:

In the Claims

At Column 4, Lines 62-63 (Claim 5, Lines 9-10), please change "in the forward directions;" to -- in the forward direction; --.

At Column 5, Line 6 (Claim 5, Line 20), please change "in the forward directions;" to -- in the forward direction; --.

At Column 5, Line 9 (Claim 5, Line 23), please change "in the reverse directions;" to -- in the reverse direction; --.

Signed and Sealed this
First Day of August, 2023

Katherine Kelly Vidal
*Director of the United States Patent and Trademark Office*